Figure 1:
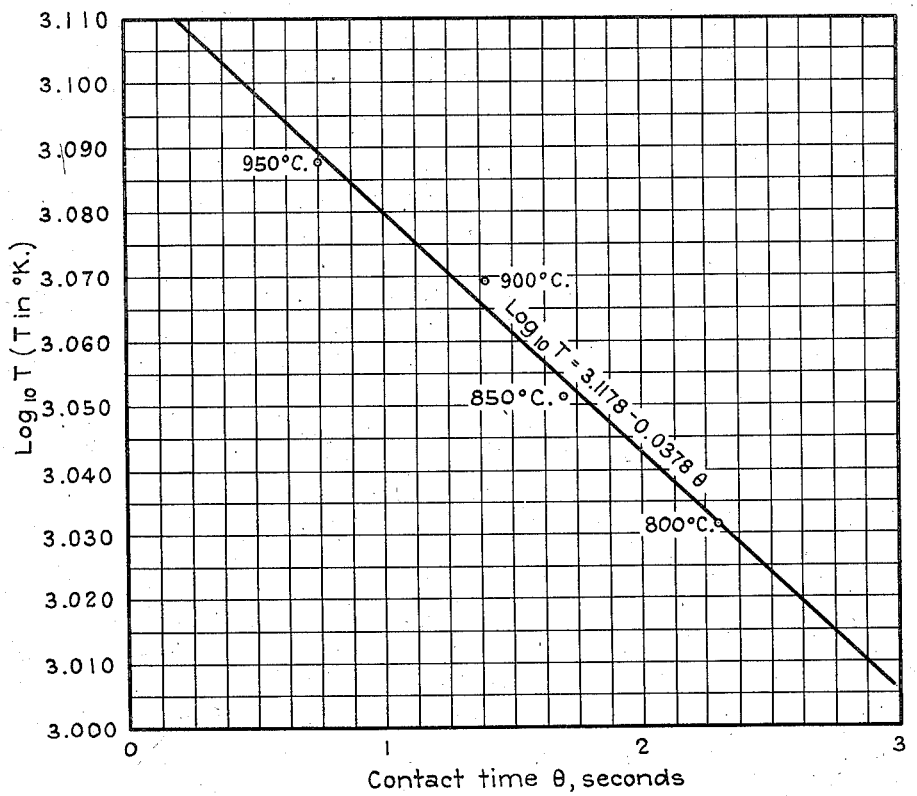

Nov. 24, 1936.  H. M. SMITH ET AL  2,061,598

PROCESS FOR PRODUCING ETHYLENE

Filed April 26, 1934

Harold M. Smith
Peter Grandone
INVENTORS
BY
ATTORNEY

Patented Nov. 24, 1936

2,061,598

UNITED STATES PATENT OFFICE 2,061,598

PROCESS FOR PRODUCING ETHYLENE

Harold M. Smith and Peter Grandone, Bartlesville, Okla.

Application April 26, 1934, Serial No. 722,522

1 Claim. (Cl. 260—170)

(Granted under the act of March 3, 1883, as amended April 30, 1928; 370 O. G. 757)

This invention described herein may be manufactured and used by or for the Government for governmental purposes, without the payment to us of any royalty thereon.

This invention generically relates to the pyrolysis of natural gas, more especially it is directed to a process for the production of ethylene from the thermal decomposition of the natural gas, typified by that obtained from the Cliffside structure of the gas field at Amarillo, Texas.

An analysis of Amarillo gas disclosed the following composition:—

Analysis

| Gas | Percent | Gms/cu. ft. |
|---|---|---|
| $CH_4$ | 64.79 | 13.08 |
| $C_2H_6$ | 3.71 | 1.40 |
| $C_3H_8$ | 1.89 | 1.08 |
| $C_4H_{10}$ | .98 | .74 |
| $C_5H_{12}$ | .21 | .20 |
| $C_6H_{14}$ | .18 | .21 |
| $N_2$ | 25.53 | |
| He | 1.96 | |
| $CO_2$ | .75 | |
| Total hydcs. | 71.76 | 16.71 |

In their efforts to devise and improve processes for the conversion of natural gas hydrocarbons to commercially valuable products such as ethylene or benzene investigators have been handicapped in attaining their objective through lack of sufficient information as to the conditions necessary for the most efficient treatment. This deficiency in the necessary data is especially apparent in dealing with gas mixtures, since each mixture will have its own particular optimum conditions for pyrolysis and makes necessary independent determinations for each type of mixture. We have conducted a systematic pyrolytic study of gas from an important field situated in the vicinity of Amarillo, Texas, and have ascertained some of the operating conditions necessary when this gas is processed to produce ethylene.

The object of this invention is to provide a method for the production of ethylene from natural gas originating in the Cliffside structure of the Amarillo gas field.

When natural gas hydrocarbons are subjected to the action of heat the simple hydrocarbons are split and "free radicals" are formed. These "free radicals" very quickly recombine in numerous new and different combinations, and these new compounds are also subject to condensation and polymerization reactions so that there finally results from thermal decomposition a number of different products such as hydrogen, acetylene, ethylene, benzene, naphthalene, anthracene and pyrene and increasingly heavier compounds until the final degradation product, carbon, is obtained. Some of these products are what may be called primary reaction products in that they are the simplest products that can be isolated in a stable condition; while other products are designated as secondary in that they may be assumed to proceed from the polymerization and condensation reactions of the primary products. Hydrogen, acetylene, and ethylene are examples of the primary products, and benzene, naphthalene and the remainder of the heavy compounds are secondary products. Since the object of this invention is the production of one of the primary products it is apparent that the time factor must be very important. In other words, if a maximum production of ethylene is to be obtained, then the series of reactions started by the application of heat must be stopped before the conversion of the primary products to secondary products has occurred to any large extent.

We have carried out numerous experiments at several temperatures to determine the time the gas should remain in contact with the heated reaction tube so that the maximum amount of ethylene may be produced from the natural gas. As a result of these experiments we have found that the following linear relationship holds between the temperature and the contact time for the maximum production of ethylene at atmospheric pressure:

$$\log_{10} T = 3.1178 - .0378 \theta$$

where $T$ is the temperature expressed in degrees Kelvin and $\theta$ is the time of contact of the gas in the heated zone expressed in seconds, calculated for the gas at the temperature of the reaction tube. This relationship is clearly illustrated in Figure 1, where the logarithm of the temperature expressed in degrees Kelvin is plotted against the contact time in seconds. This equation is valid for temperatures from 750° C. to 975° C.

In accordance with this discovery when Amarillo gas is processed to produce the maximum amount of ethylene at a certain temperature, the time which a given particle of gas should remain in the reaction tube should be determined by use of this equation. The equation may be changed into a more convenient form, giving the contact time directly, as follows:

$$\theta = \frac{3.1178 - \log_{10} T}{.0378}$$

For example, if it is desired to process Amarillo gas at a temperature of 875° C. and obtain the maximum ethylene yield at that temperature, then proceeding according to the above equation, 875° C.=1148 Kelvin, and $\log_{10}$ 1148=3.0599 therefore the contact time necessary will be $$\theta = \frac{3.1178 - 3.0599}{.0378}$$

or 1.53 seconds

Figure 2:
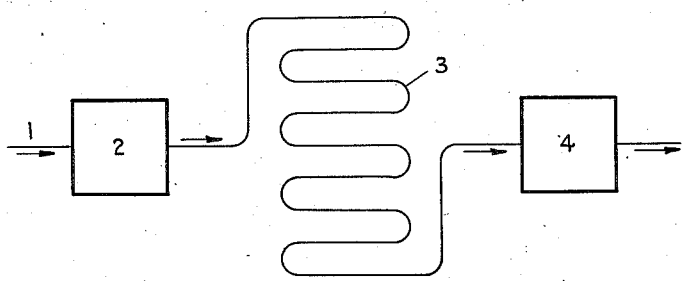

Coming now to a more detailed description of the process, reference should be made to Figure 2, which is a diagrammatic drawing in elevation of an assembly of apparatus suitable for the conduction of the thermal decomposition. The gas supply, natural gas from the Cliffside structure of the Amarillo field, enters the system at 1, and passes through measuring devices 2 into the cracking chamber 3. This chamber may consist of a single tube or of several lengths of tubing arranged in parallel or even as a coil but regardless of its arrangement, the gas must enter at such a rate that it will remain in the heated portion the proper time at the temperature used, as determined by the following formula $$\theta = \frac{3.1178 - \log_{10} T}{.0378}$$

The gas leaving the cracking tube should now contain the maximum amount of ethylene that can be obtained from this gas at the temperature employed. The ethylene containing gas may now be subjected to any one of several different treatments in apparatus 4, depending upon the use it is desired to make of the ethylene, for any of which the usual commercial equipment is suitable. In fact the entire equipment may be so constructed that it will conform to the usual commercial practices, the only criterion being that the cracking unit have the proper volume to provide a contact time for cracking in accordance with the equation hereinabove given.

Having described our invention, what we claim as new and wish to secure by Letters Patent is:

A pyrolytic process for obtaining a maximum yield of ethylene for any temperature within the temperature range of 750° C.–975° C., from natural gas typified by that obtained from the Amarillo region consisting in limiting the thermal decomposition of the gas to products susceptible of isolation in a stable condition by passing the gaseous particles through a reaction tube at any temperature between 750° C.–975° C. at atmospheric pressure and for a contact period based on the linear relation between the contact time and the log of the temperature expressed in degrees Kelvin, and defined by the formula—

$$\text{contact time in seconds} = \frac{3.1178 - \log_{10} T}{.0378}$$

HAROLD M. SMITH.
PETER GRANDONE.